United States Patent
Ahn (10) Patent No.: US 11,359,572 B2
(45) Date of Patent: Jun. 14, 2022

(54) METHOD FOR LEARNING EMERGENCY INJECTION CORRECTION OF INJECTOR FOR PREVENTING MISFIRE

(71) Applicants: HYUNDAI MOTOR COMPANY, Seoul (KR); KIA MOTORS CORPORATION, Seoul (KR)

(72) Inventor: Kyung-Ho Ahn, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 144 days.

(21) Appl. No.: 16/671,358

(22) Filed: Nov. 1, 2019

(65) Prior Publication Data

US 2020/0200115 A1  Jun. 25, 2020

(30) Foreign Application Priority Data

Dec. 24, 2018 (KR) .................. 10-2018-0168545

(51) Int. Cl.
- *F02D 41/30* (2006.01)
- *F02D 41/24* (2006.01)
- *F02D 41/22* (2006.01)

(52) U.S. Cl.
CPC ......... *F02D 41/3076* (2013.01); *F02D 41/22* (2013.01); *F02D 41/2441* (2013.01); *F02D 41/2451* (2013.01); *F02D 41/3005* (2013.01); *F02D 2200/1015* (2013.01)

(58) Field of Classification Search
CPC ............ F02D 41/3076; F02D 41/2451; F02D 41/3005; F02D 41/2441; F02D 41/22; F02D 2200/1015; F02D 41/221; F02D 2200/0616; F02D 2041/224; F02D 2200/0602; F02D 41/2467; F02D 41/402; Y02T 10/40
USPC ....................................... 123/478
See application file for complete search history.

(56) References Cited

U.S. PATENT DOCUMENTS

2017/0058820 A1* 3/2017 Sugimoto .............. F02M 63/02

FOREIGN PATENT DOCUMENTS

KR          101273055 B1     6/2013

OTHER PUBLICATIONS

Kyung-ho Ahn, et al., "Test and Analysis of Cylinder-Individual Injection Control Using 350-bar Gasoline Injector Samples with Different Injection Shifts", Hyundai Motor Group Conference, 6 pgs.

* cited by examiner

*Primary Examiner* — Scott A Reinbold
(74) *Attorney, Agent, or Firm* — Lempia Summerfield Katz LLC (57) ABSTRACT

The present disclosure provides a method for learning emergency injection correction of an injector for preventing misfire. A misfire rate in a multi-stage injection mode is monitored, and it is controlled to be forcibly switched to a single injection mode when the misfire rate by the monitoring is equal to or greater than a specific value, such that injector injection correction learning is performed according to a learning entry condition. Accordingly, it is possible to reduce the deviation between cylinders by the sufficient injection amount deviation correction learning, thereby preventing misfire of the injector.

6 Claims, 8 Drawing Sheets

FIG.7B

METHOD FOR LEARNING EMERGENCY INJECTION CORRECTION OF INJECTOR FOR PREVENTING MISFIRE

CROSS-REFERENCE TO RELATED APPLICATION

This application claims priority to and the benefit of Korean Patent Application No. 10-2018-0168545, filed on Dec. 24, 2018, which is incorporated herein by reference in its entirety.

FIELD

The present disclosure relates to a method for injecting fuel into an engine by an injector.

BACKGROUND

The statements in this section merely provide background information related to the present disclosure and may not constitute prior art.

Lighting of a warning lamp due to misfire is one of the sensitive issues in the field, among them, occurrence of the misfire caused by the deviation of the injection amounts of an injector between engine cylinders should be reduced, and its need is expected to be larger when a 350 bar system is applied later.

In the actual case, we have discovered that occurrence of the misfire is not in the section of only a small flow rate, but also in the area where a sufficient flow rate is provided (linear section).

In order to improve the deviation of the injection amounts between the injectors, it is possible to use deviation correction logic using the fuel pressure drop phenomenon upon injection, and a single injection mode, sufficient fuel pressure and injection amount, and the like are desired for accuracy of learning when using the corresponding logic.

The improvement of the 350 bar injector reduces Particulate Number (PN) deterioration due to channel caulking upon injection, such that it is advantageous to secure a multi-stage injection section as much as possible.

However, we have also discovered that due to expansion of the multi-stage injection according to an increase in an injection pressure in the development of the injector technology, it is difficult to secure an injection amount deviation correction learning condition of the multi-stage injection. Document KR Patent No. 10-1273055 relates to a method for multi-point injection fuel flux auto calibration.

The above information disclosed in this Background section is only for enhancement of understanding of the background of the present disclosure, and therefore it may contain information that does not form the prior art this is already known to a person of ordinary skill in the art.

SUMMARY

The present disclosure provides a method for learning emergency injection correction of an injector for preventing misfire by reducing the deviation between cylinders by sufficient injection amount deviation correction learning.

A method for learning emergency injection correction of an injector for preventing misfire according to one aspect of the present disclosure includes steps of monitoring a misfire rate in a multi-stage injection mode, and controlling the injector to be forcibly switched to a single injection mode when the misfire rate by the monitoring is equal to or greater than a specific value, such that injector injection correction learning is performed according to an injector injection correction learning condition.

More specifically, the method for learning the emergency injection correction of the injector for preventing misfire further includes steps of comparing an emergency learning counter with respect to the injector injection correction learning with a second setting value, determining whether the misfire rate of a flow rate linear section is greater than a third setting value and smaller than a failure detection setting value when the emergency learning counter is equal to or smaller than the second setting value, performing emergency learning when the misfire rate of the flow rate linear section is greater than the third setting value and smaller than the failure detection setting value, changing a target fuel pressure and an injection mode after performing the emergency learning, determining whether to establish the injector injection correction learning condition, and performing injection correction learning when satisfying the injector injection correction learning condition.

According to a further aspect of the present disclosure, the performing the injection correction learning controls an injector opening time between engine cylinders.

According to a further aspect of the present disclosure, the method for learning the emergency injection correction of the injector for preventing misfire further includes a step of resetting the performing the emergency learning when the emergency learning counter is greater than the second setting value, and after resetting the performing the emergency learning, the determining whether to establish the injector injection correction learning condition is performed.

According to a further aspect of the present disclosure, the method for learning the emergency injection correction of the injector for preventing misfire further includes a step of resetting the performing the emergency learning when the misfire rate of the flow rate linear section is equal to or smaller than the third setting value or equal to or greater than the failure detection setting value, and after resetting the performing the emergency learning, the determining whether to establish the injector injection correction learning condition is performed.

According to a further aspect of the present disclosure, the method for learning the emergency injection correction of the injector for preventing misfire further includes steps of confirming a Driving Cycle (DC) counter or whether a failure code is erased or is forcibly reset and resetting the emergency learning counter to zero (0) when the DC counter exceeds a first setting value, or the failure code is erased or is forcibly reset, and the comparing the emergency learning counter with the second setting value is performed after resetting the emergency learning counter to 0.

According to a further aspect of the present disclosure, the method for learning the emergency injection correction of the injector for preventing misfire further includes steps of comparing the injection correction learning counter with a fourth setting value after performing the performing the injection correction learning and increasing the emergency learning counter and resetting the learning counter to 0 when the injection correction learning counter is greater than the fourth setting value.

According to the method for learning the emergency injection correction of the injector for preventing misfire of the present disclosure, it is possible to secure the injector injection correction learning frequency by forcibly changing the operation mode through the monitoring of the misfire rate before failure is detected, thereby urgently updating the learning value.

Accordingly, it is possible to reduce the possibility of occurring the misfire caused by the caulking/aging of the injector and the deviation of the single component as much as possible, and it is possible to reduce the deterioration of the operating performance by improving combustion stability.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
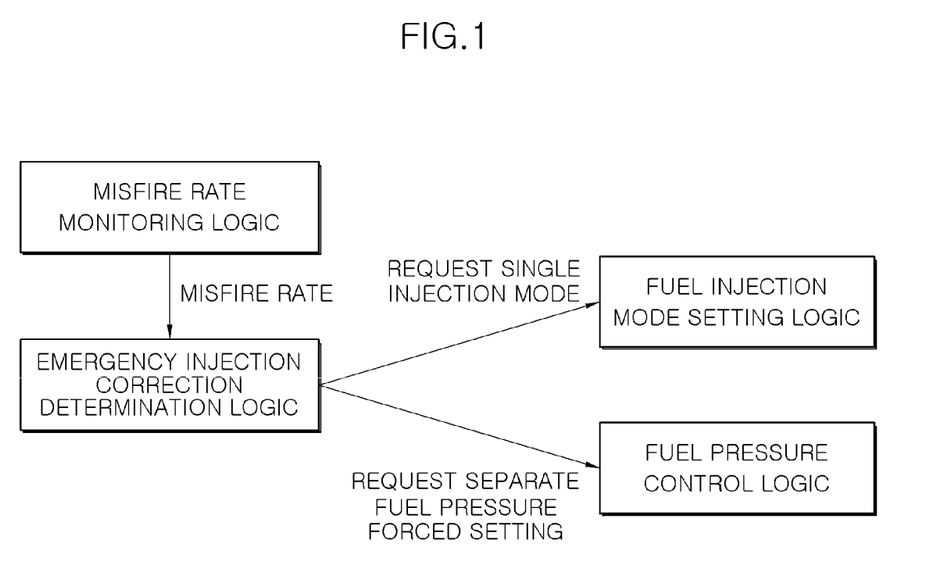
FIGS. 1 and 2 are diagrams conceptually illustrating a method for learning emergency injection correction of an injector for preventing misfire of the present disclosure.
Figure 2:
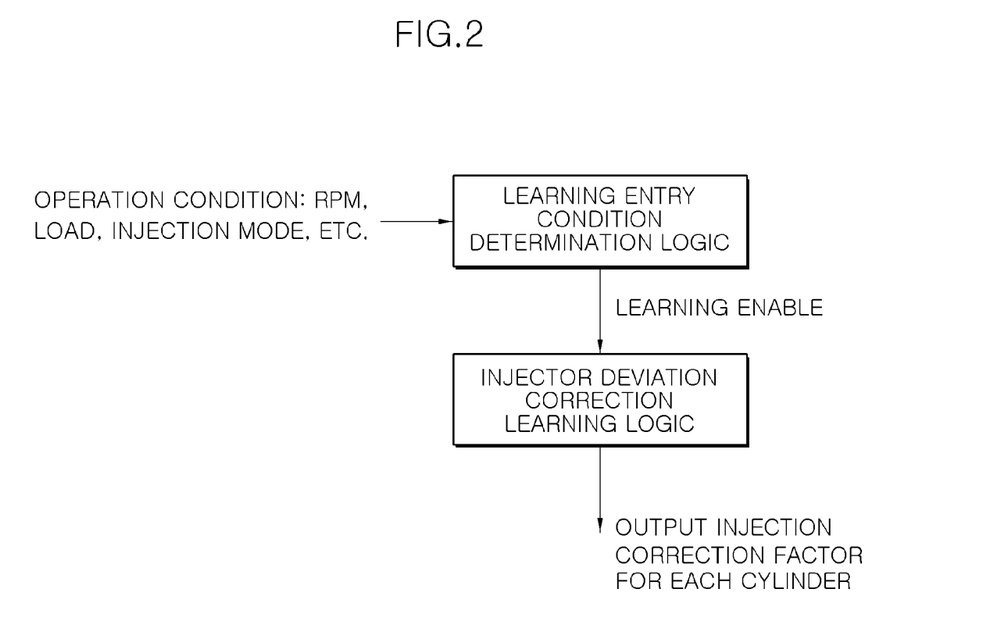
Figure 3:
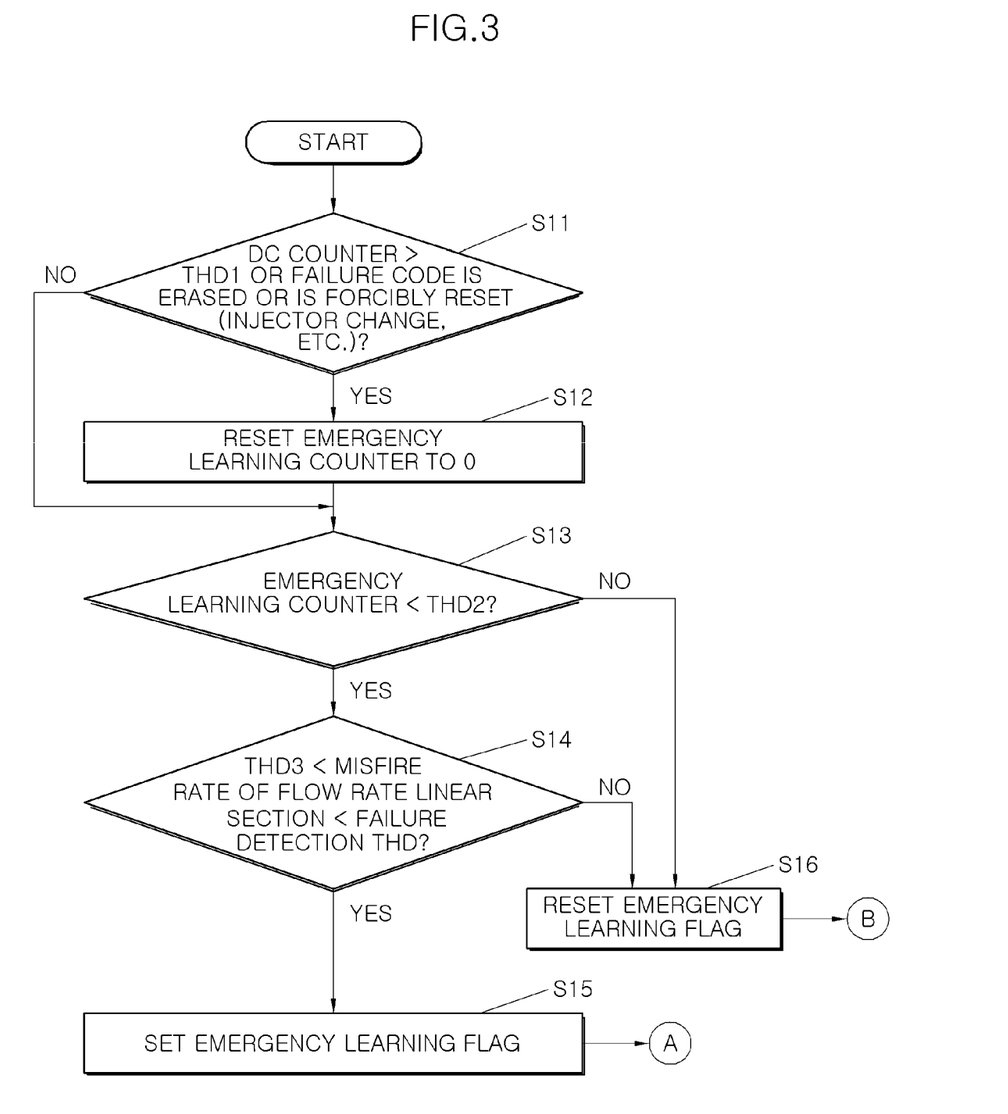
FIGS. 3 and 4 are diagrams sequentially illustrating the method for learning emergency injection correction of the injector for preventing misfire of the present disclosure.
Figure 4:
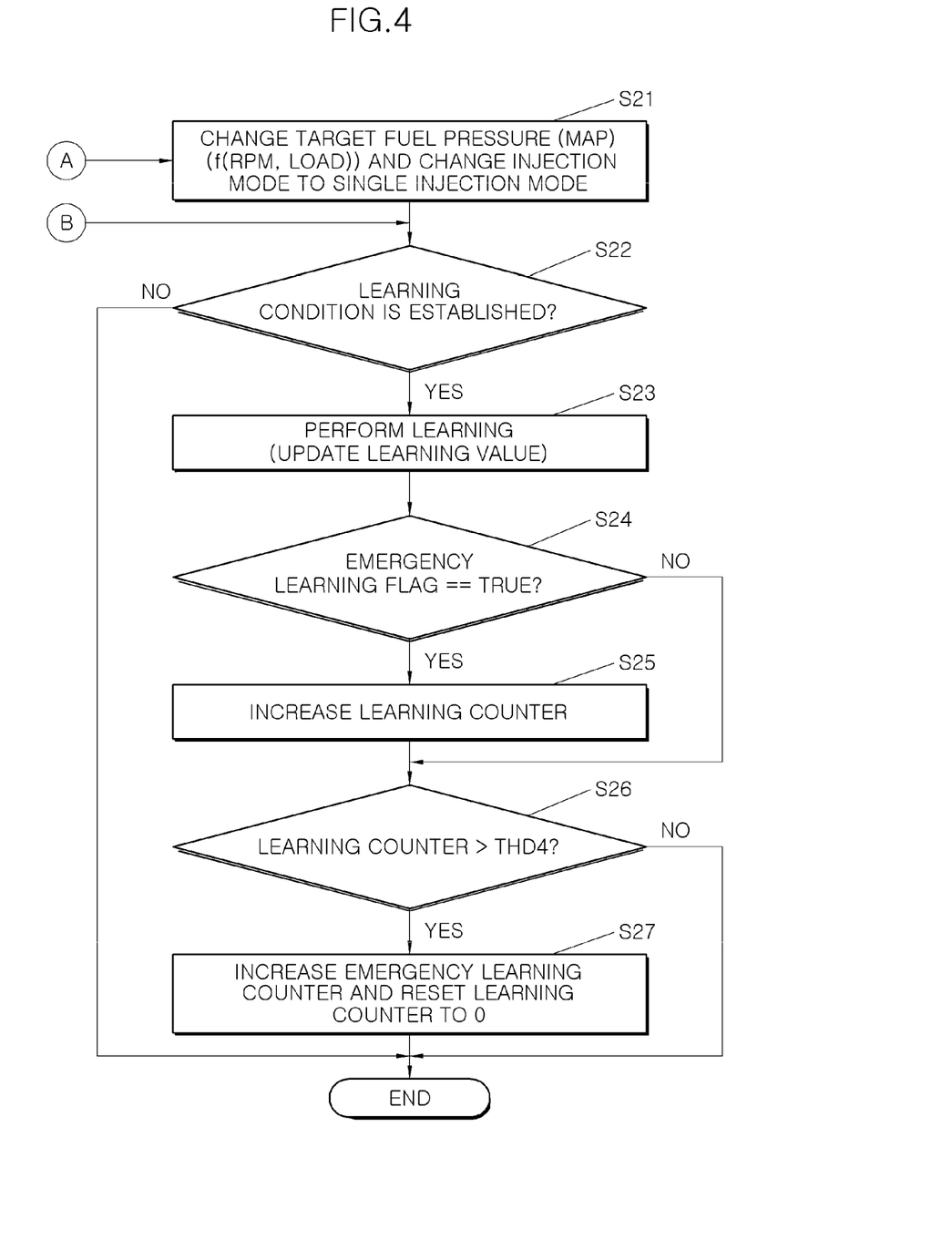

FIGS. 1 and 2 are diagrams conceptually illustrating a method for learning emergency injection correction of an injector for preventing misfire of the present disclosure, and FIGS. 3 and 4 are diagrams sequentially illustrating the method for learning emergency injection correction of the injector for preventing misfire of the present disclosure.

Hereinafter, a method for learning emergency injection correction of an injector for preventing misfire according to a form of the present disclosure will be described with reference to FIGS. 1 to 4.

The present disclosure is a method for performing learning for preventing misfire from deteriorating due to an increase in deviation caused by insufficient learning amount in performing logic for correcting the deviation of an injector for each cylinder, which is one of the causes of misfire.

That is, as illustrated in FIG. 1, it is possible to determine a misfire rate by misfire rate monitoring logic, and to request a change in a control mode when the misfire rate is high by emergency injection correction determination logic, thereby solving insufficient learning amount.

That is, the change in the control mode requests fuel injection mode setting logic to perform in a single injection mode, and requests fuel pressure control logic to perform a separate fuel pressure forced setting.

According to the change in the control mode, as illustrated in FIG. 2, an injector injection correction learning condition is determined so that injector deviation correction learning logic is performed under the learnable condition, thereby outputting an injection correction factor for each cylinder.

More specifically, as illustrated in FIG. 3, it is confirmed a Driving Cycle (DC) counter or whether a failure code is erased or is forcibly reset S11.

That is, it is confirmed whether the DC counter exceeds a first setting value (THD1), or whether the failure code has been erased, or has been forcibly reset by the change in the injector or the like, and in such a case, an emergency learning counter is reset to zero (0) at step S12, and then the emergency learning counter is compared with a second setting value (THD2) S13. When it is not the case of S11, the emergency learning counter is compared with the second setting value (THD2) without resetting the emergency learning counter S13.

As a result, when the emergency learning counter is smaller than the second setting value (THD2), the misfire rate of the flow rate linear section is compared and determined S14, and when it is equal to or greater than the second setting value (THD2), an emergency learning flag is reset at step S16.

The comparing and determining the misfire rate of the flow rate linear section at step S14 sets a flag for performing emergency learning when the misfire rate of the flow rate linear section is greater than a third setting value (THD3) and smaller than a failure detection THD value S15, and when it is out of the range, the emergency learning flag is reset S16.

That is, as illustrated in FIGS. 3 and 4, when it is determined that the emergency learning counter is equal to or greater than the second setting value (THD2) in the S13, or when it is determined that the misfire rate of the flow rate linear section is out of the normal range in the step S14, it is determined whether to establish the injector injection correction learning condition without changing the injection mode S22 after resetting the emergency learning flag S16, thereby performing the injection correction learning.

On the other hand, when the misfire rate of the flow rate linear section is in the normal range in the S14, a learning frequency can be insufficient, such that the flag for performing the emergency learning is set S15, and it is controlled to be changed to a single injection mode for performing the learning S21.

In the S21, as illustrated in FIGS. 1 and 4, the injection mode is changed to the single injection mode, and a target fuel pressure is changed according to revolutions per minute (RPM) and a load.

Thereafter, when the injector injection correction learning condition including the RPM, the load, and the injection mode is established in the S22, the learning is performed to update a learning value S23.

Then, as a result of performing the learning in the S23, it is determined whether the emergency learning flag is true S24, and when it is true, the learning counter is increased S25, and then the learning counter is compared with a fourth setting value (THD4) S26, and when it is not true, the learning counter is compared with the fourth setting value (THD4) without increasing the learning counter S26.

As a comparison result in the S26, when the learning counter is greater than the fourth setting value (THD4), the emergency learning counter is increased, and the learning counter is reset to zero (0) again S27.

As described above, the present disclosure can change the single injection mode and the target fuel pressure if desired according to the emergency learning counter and the misfire rate of the flow rate linear section to perform the injection correction learning, and can increase the emergency learning counter as the learning counter increases to perform the learning appropriately.

As a result, the injection deviation between the cylinders is corrected by the injection correction learning, thereby controlling to prevent occurrence of the misfire caused by the injection deviation.

Hereinafter, the injection correction logic performed in the S23 will be described.

Figure 5:
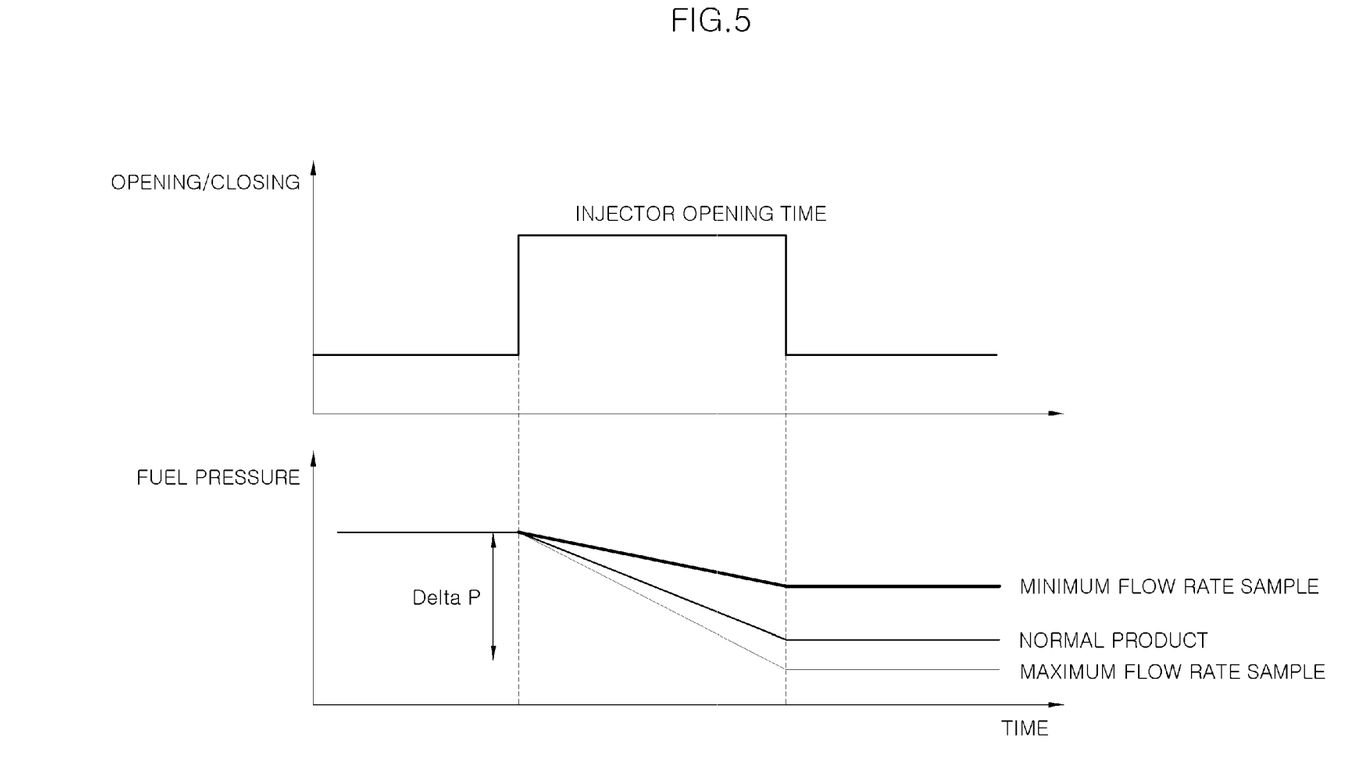
FIG. 5 is a diagram illustrating an example of the deviation of a flow rate by the injector.

FIG. 5 is a diagram illustrating an example of the deviation of the flow rate by an injector.

That is, it can be seen that a fuel pressure difference between the minimum flow rate sample and the maximum flow rate sample is generated by delta P by monitoring the fuel pressure of each injector.

Figure 6:
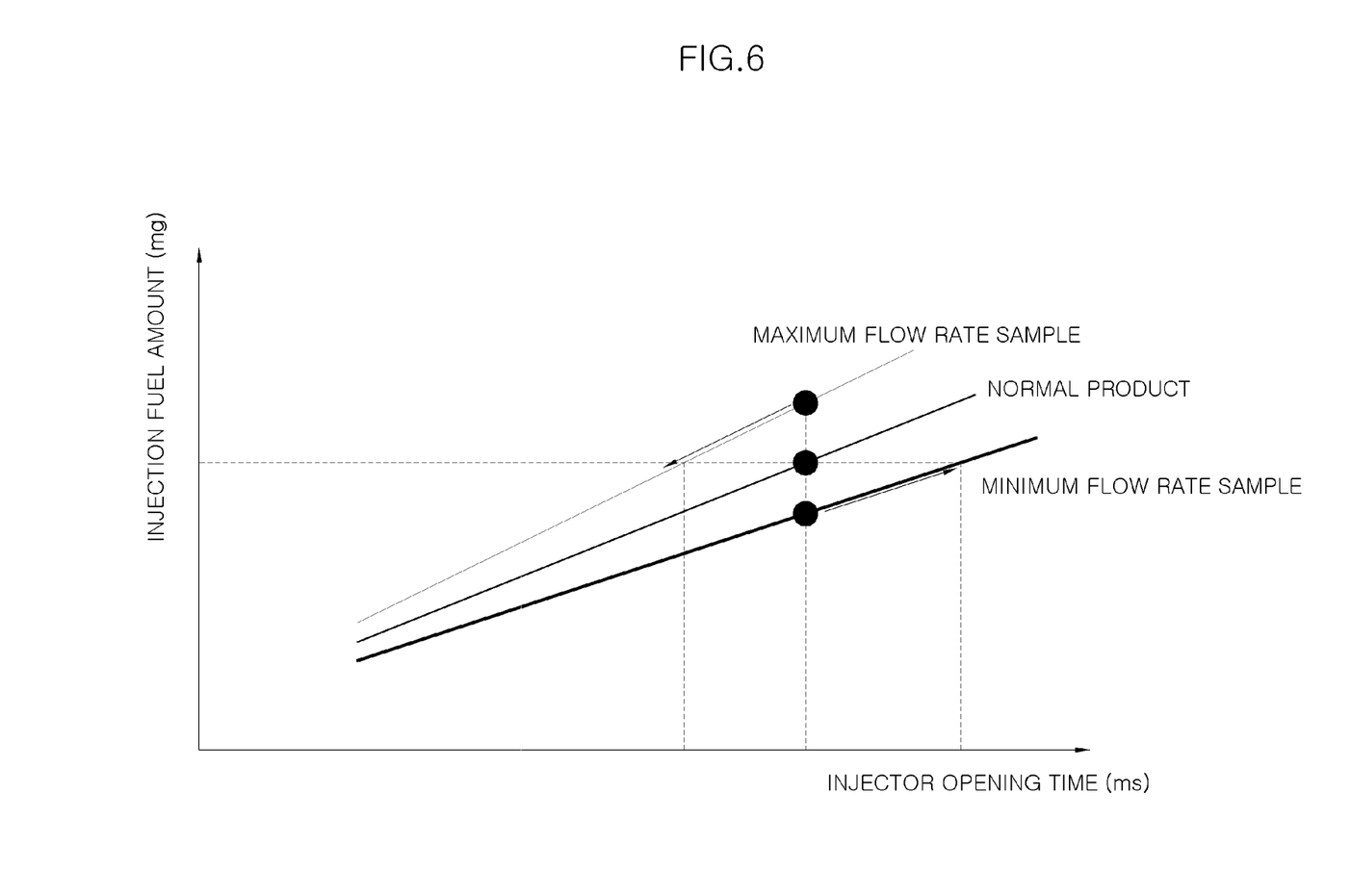
FIG. 6 is a diagram illustrating a method for correcting the flow rate of injection by injection correction logic.

Correction of the difference is performed by controlling an injector opening time as in FIG. 6.

That is, the maximum flow rate sample reduces the injector opening time than normal, and the minimum flow rate sample increases the injector opening time than normal, thereby reaching a target fuel amount, respectively.

Figure 7A:
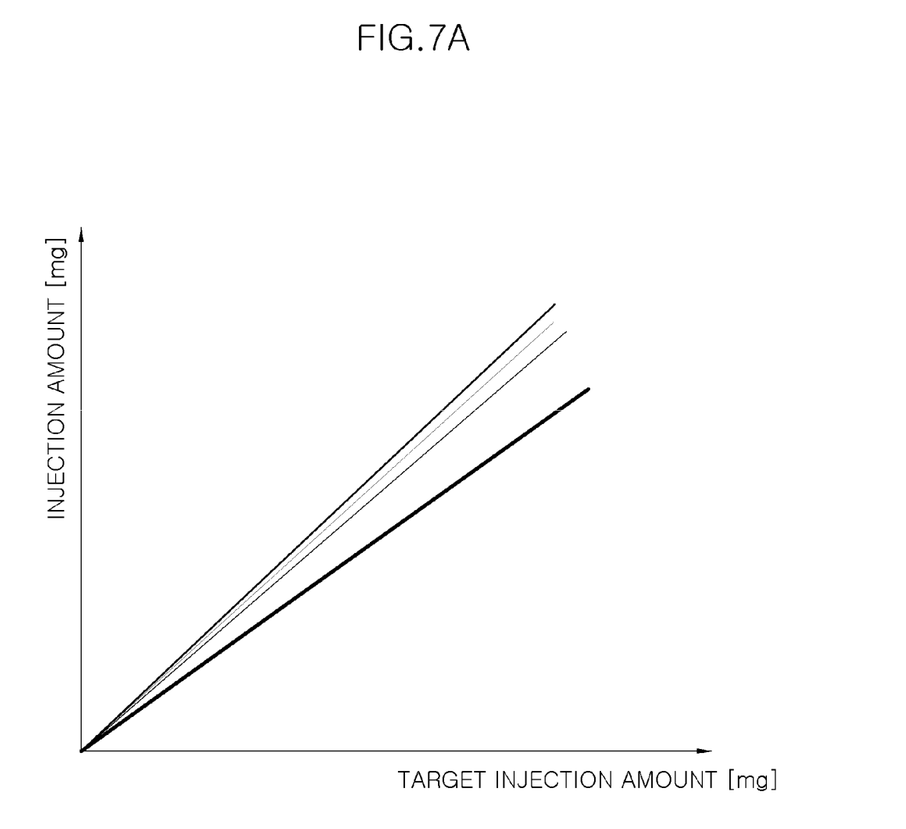
FIG. 7A is a diagram illustrating the flow rate of injection before correction of four injectors.
Figure 7B:
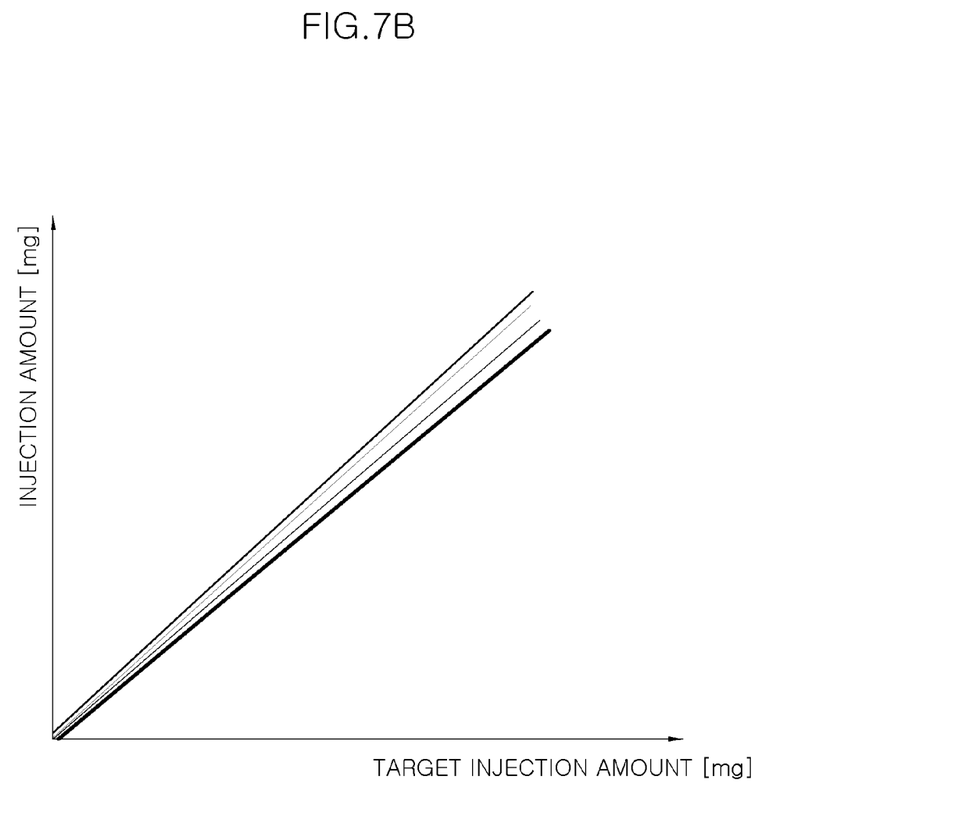
FIG. 7B is a diagram illustrating the flow rate of injection after the correction of the four injectors.

Therefore, it is possible to reduce the difference in the injection amounts between the four injectors as in FIG. 7A and the deviation of the injection amounts between the four injectors as in FIG. 7B.

As described above, it is possible to determine the deviation of the injection flow rates between the cylinders through the fuel pressure reinforced amount upon injection, and for this purpose, there should be no influence of other interference on the fuel pressure upon injection.

That is, there should be no drive of a fuel pump, the injection of other cylinders, and the like in a fuel pressure measurement section upon injection and before/after injection.

Therefore, the multi-stage injection itself has poor pressure stability, and due to the multi-stage injection, there is a possibility of increasing the interference such as the drive of the pump due to the prolonged injection section.

As a result, the injection flow rate correction learning frequency is limited when using the PN emission improvement strategy through the multi-stage injection in nearly all sections according to the improvement in the 350 bar injector.

Therefore, the present disclosure can forcibly change the injection mode to the single injection mode in the S21 for the injection flow rate correction learning, thereby securing the learning frequency.

In addition, it is possible to change the target fuel pressure by a low engine speed, a high rail pressure, and the like.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. A method for learning emergency injection correction of an injector for preventing misfire, the method comprising steps of:
    monitoring a misfire rate in a multi-stage injection mode, and controlling the injector to be forcibly switched to a single injection mode when the misfire rate by the monitoring is equal to or greater than a specific value, such that an injector injection correction learning is performed according to an injector injection correction learning condition,
    wherein the injector injection correction learning comprises:
        confirming the injector injection correction learning condition based on whether a driving cycle (DC) counter exceeds a first setting value (THD 1), or a failure code has been erased or forcibly reset;
    in response to determining that the DC counter exceeds the first setting value (THD 1), or the failure code has been erased or forcibly reset, resetting an emergency learning counter to zero (0);
    after resetting the emergency learning counter to zero (0), comparing the emergency learning counter with a second setting value (THD 2);
        in response to determining that the emergency learning counter is equal to or smaller than the second setting value (THD 2), determining whether the misfire rate of a flow rate linear section is greater than a third setting value (THD 3) and smaller than a failure detection setting value;
        in response to determining that the misfire rate of the flow rate linear section is greater than the third setting value (THD 3) and smaller than the failure detection setting value, performing emergency learning;
        changing a target fuel pressure and an injection mode after performing the emergency learning;
        determining whether to establish the injector injection correction learning condition; and
        performing injection correction learning when satisfying the injector injection correction learning condition.

2. The method for learning the emergency injection correction of the injector for preventing misfire of claim 1, wherein the performing the injection correction learning controls an injector opening time between engine cylinders.

3. The method for learning the emergency injection correction of the injector for preventing misfire of claim 2, further comprising step of: resetting the performing the emergency learning when the emergency learning counter is greater than the second setting value (THD 2),
    wherein after resetting the performing the emergency learning, the determining whether to establish the injector injection correction learning condition is performed.

4. The method for learning the emergency injection correction of the injector for preventing misfire of claim 2, further comprising step of: resetting the performing the emergency learning when the misfire rate of the flow rate linear section is equal to or smaller than the third setting value (THD 3) or equal to or greater than the failure detection setting value,
    wherein after resetting the performing the emergency learning, the determining whether to establish the injector injection correction learning condition is performed.

5. The method for learning the emergency injection correction of the injector for preventing misfire of claim 2, wherein after resetting the emergency learning counter to zero (0), the comparing the emergency learning counter with the second setting value (THD 2) is performed.

6. The method for learning the emergency injection correction of the injector for preventing misfire of claim 2, further comprising steps of:

comparing an injection correction learning counter with a fourth setting value (THD 4) after performing the performing the injection correction learning; and increasing the emergency learning counter and resetting the learning counter to zero (0) when the injection correction learning counter is greater than the fourth setting value (THD 4).

\* \* \* \* \*